United States Patent [19]

Pastor

[11] Patent Number: 4,888,803

[45] Date of Patent: Dec. 19, 1989

[54] METHOD AND APPARATUS FOR VERIFYING A VALUE FOR A BATCH OF ITEMS

[75] Inventor: Jose Pastor, Westport, Conn.

[73] Assignee: Pitney Bowes Inc., Stamford, Conn.

[21] Appl. No.: 249,155

[22] Filed: Sep. 26, 1988

[51] Int. Cl.[4] .......................... G09C 3/08; H04L 15/34

[52] U.S. Cl. .......................................... 380/51; 380/23; 380/55; 364/464.02; 364/464.03; 364/466

[58] Field of Search .................... 364/200, 900, 464.02, 364/464.03, 466; 380/23, 51, 52, 55, 3, 4

[56] References Cited

U.S. PATENT DOCUMENTS

| | | | |
|---|---|---|---|
| 4,253,158 | 2/1981 | McFiggaris | 364/900 |
| 4,322,577 | 3/1982 | Brandstrom | 380/37 |
| 4,447,890 | 5/1984 | Duwell et al. | 364/900 |
| 4,637,051 | 1/1987 | Clark | 382/1 |
| 4,641,346 | 2/1987 | Clark et al. | 380/3 |
| 4,649,266 | 3/1987 | Eckert | 380/23 X |
| 4,660,221 | 4/1987 | Dlugos | 380/23 |
| 4,757,537 | 7/1988 | Edelmann et al. | 380/51 |
| 4,780,828 | 10/1988 | Whisker | 364/464.02 |
| 4,780,835 | 10/1988 | Sievel et al. | 364/464.02 X |
| 4,813,912 | 3/1989 | Chickneas et al. | 364/464.02 |
| 4,829,568 | 5/1989 | Clark et al. | 380/23 |
| 4,831,555 | 5/1989 | Sansone et al. | 364/464.02 X |
| 4,835,713 | 5/1989 | Pastor | 364/464.02 X |

OTHER PUBLICATIONS

Shamir–How to Share a Secret, CACM, vol. 22, Nov. '79, pp. 612–613.

Benaloh–Cryptographic Capsules: A Distinctive Primitive for Interactive Protocols Advances in Cryptology, Crypto '86 Proceedings–1987.

*Primary Examiner*—Stephen C. Buczinski
*Assistant Examiner*—Bernarr Earl Gregory
*Attorney, Agent, or Firm*—Robert H. Whisker; Melvin J. Scolnick; David E. Pitchenik

[57] ABSTRACT

A method and apparatus for verifying a total value for a batch of items, and particularly a total postage value for a batch of mail pieces. A batch of mail is prepared in a conventional manner in accordance with information generated by a data processing system. The information is also provided to a secure manifest system which generates an output to be marked on each item. The manifest system determines a particular value for each item and generates a message identifying the entire batch. The message is encrypted and expressed as k ordered numbers. The ordered numbers are taken as parameters of a function $f(x)=a_o+a_1x+\ldots a_{k-1}x^{k-1} \bmod p$. A unique arbitrary value, $x_i$, is selected for each item and a value f of $x_i$ is determined. Each item is then marked with indicia including the postage value $v_i$, $x_i$, and $f(x_i)$. A party may then sample the batch to obtain k items, determine the parameters, a, from k ordered pairs $x_i$, $f(x_i)$, decrypt the message and verify the postage value, V. Where the batch includes a number of classes the values, $x_i$, for each class may be chosen to be members of the same class of congruent residues. A second function $g_j(x_i)$ may then be computed to identify each class and tested in the manner described above. Further assurance is provided by testing each value, $x_i$, to assure that for a given class, each value, $x_i$, is of the same class of congruent residues.

9 Claims, 4 Drawing Sheets

METHOD AND APPARATUS FOR VERIFYING A VALUE FOR A BATCH OF ITEMS

BACKGROUND OF THE INVENTION

Many techniques for franking of mail are known. For individual mailers postage stamps are perhaps the best known, while for larger mailers postage meters, such as are described for example in U.S. Pat. No.: 4,301,507; to: Soderberg et al., are available. For very large mailers the U.S. Postal Service permit mail allows mailings of large batches of mail where each mail piece is substantially the same. Permit mail however, is not suitable for large batches of mixed mail where postage values may differ from piece to piece. Until recently, such mixed mail was produced by large mailers, such as oil companies and credit card companies, using high speed inserter systems to assemble the mail and banks of postage meters preset to various amounts to appropriately meter each mail piece. More recently, the assignee of the subject invention has marketed what is referred as a manifest mail system under the trademark "Postedge". In this system a secure apparatus provides a "manifest" which describes a batch of mail, and which includes the total postage value for that batch, as computed by the secure apparatus from information relating to the batch. In order to authenticate the manifest at least a portion of the information on the manifest is encrypted in a secure manner and also printed on the manifest, whereby the Postal Service can easily authenticate manifest by decrypting the encrypted information and comparing it to the plain text manifest.

To assure the accuracy of the total postage value computed by the secure apparatus the system also causes each mail piece to be printed with plain text indicia corresponding to the postage for that mail piece, as well as additional information such as a batch number, mailer i.d., date and time, which identifies the mail piece as part of a batch corresponding to the manifest. The Postal Service, once it has confirmed that the manifest is authentic, may then compare the description in the manifest with the batch to assure that the manifest was generated using information which accurately described the batch. The Postal Service may then redetermine the postage for a sample of mail pieces selected from the batch and compare the re-determined postage values with the indicia to assure that the total postage value for the batch was based on accurate postage values for each individual mail piece. The manifest then serves as evidence of the correct postage that has, or should be, paid for the batch.

In such manifest systems the description of the batch typically will include the total number of mail pieces for each postage value (or equivalently weight) and class (e.g. 1234 1st class mail pieces at 25 cents, etc.). At least partly because confirming that a batch conforms to such a description requires extensive sampling of the batch Postal Service regulations require that manifest mail be in serial number order to facilitate sampling of the batch.

Another, somewhat similar technique for franking of large, mixed batches of mail is disclosed in co-pending, commonly assigned U.S. application Ser. No.: 134,671; filed: 18 Dec. 1987; to Hunter et al.

Another development in techniques for franking of mail involves the use of non-secure printers, such as computer output dot-matrix printers, to print postage meter indicia. Since such indicia may be easily duplicated by a properly controlled printer, security for such meters is provided by an encrypted indicia technique as described in U.S. Pat. No. 4,641,347; to: Clark et al. (Typically in this technique, information including the postage value and additional information sufficient to identify a mail piece is printed on the mail piece in plain text together with an encrypted corresponding message by the meter using a secure encryption algorithm. The indicia is then authenticated to provide assurance that the indicated amount has been paid by decrypting the encrypted message and comparing the decrypted message to the plain text.

Still another system for manifest mail is disclosed in commonly assigned co-pending U.S. patent application Ser. No. 813,447; filed 26 Dec. 1985, now U.S. Pat. No. 4,780,828. In this system as serialized mail is processed a secure apparatus randomly selects a sampling of serial numbers and generates a manifest including the total postage value for the batch and the selected serial numbers, encrypted using a secure encryption algorithm and the postage value for the corresponding mail pieces. The Postal Service may then verify the total postage by decrypting the selected serial numbers and verifying that the postage value for the corresponding mail pieces is correct.

While the above described techniques are believed to function successfully for their intended purpose, certain problems remain. While meters having electronic stamps would be capable of operating at higher speeds than current meters, they still require that each mail piece be individually franked by the meter, and the requirement for serialization is objectionable to large mailers since a serialized batch of mail may easily be inadvertently scrambled and require a great effort to be reordered.

Accordingly, it is an object of the subject invention to provide a method and apparatus for validating a total value for a batch of items; most preferably for validating the total postage value for a batch of items to be mailed.

It is another object of the subject invention to provide such a method and apparatus where the accuracy of the information used to determine the total value may easily be verified.

BRIEF SUMMARY OF THE INVENTION

The above objects are achieved and the disadvantages of the prior art are overcome in accordance with the subject inventions by means of a method and apparatus for verifiably marking a batch of N items. An encrypted message identifying the batch is generated and expressed in the form of k ordered numbers. A function, f, having k parameters, each of which is chosen to be equal to a particular one of the ordered numbers, is defined. The function is such that the values of the parameters can be determined from k unique ordered pairs of numbers of the form $x_i$, $f(x_i)$. A unique value, $x_i$, is chosen for each of sub items and the corresponding value, $f(x_i)$ is computed, and each item is marked with an ordered pair of numbers $x_i$, $f(x_i)$. A second party may then verify a batch by selecting k items to obtain k unique ordered pairs, determining the parameters to obtain the message and determining if the message correctly identifies the batch.

In a preferred embodiment of this subject invention, the above method is carried out by a secure apparatus. That is, an apparatus which is resistant to tampering so that a second party (e.g. the U.S. Postal Service) may be assured that the apparatus functions as intended even though it is physically in the custody of a party (e.g. a mailer) who has incentives to attempt to falsify an incorrect output of the value.

In another preferred embodiment each item is marked with a value $v_i$, and the value for the batch, V, is a function of the $v_i$. In this embodiment a second party may further verify the value, V, by confirming that the $v_i$ on each item are correct for that item.

In another preferred embodiment of the subject invention, the batch includes a number of classes and the values $x_i$ for items in a given class are chosen to be members of the same class of congruent residues.

Thus, it may be seen that the subject invention advantageously achieves the above object and is further advantageous in that the validity of the entire batch may be verified by a relatively small sample of that batch.

It is still a further advantage of the subject invention that the batch need not be presented in a serialized order.

It is still another advantage of the subject invention that the message recovered from the sample may constitute the actual manifest, thus eliminating the need for separate manifest documents.

Other objects and advantages of the subject invention will be apparent to those skilled in the art from consideration of the attached drawings, and the detailed description set forth below.

DETAILED DESCRIPTION OF PREFERRED EMBODIMENTS

Figure 1:
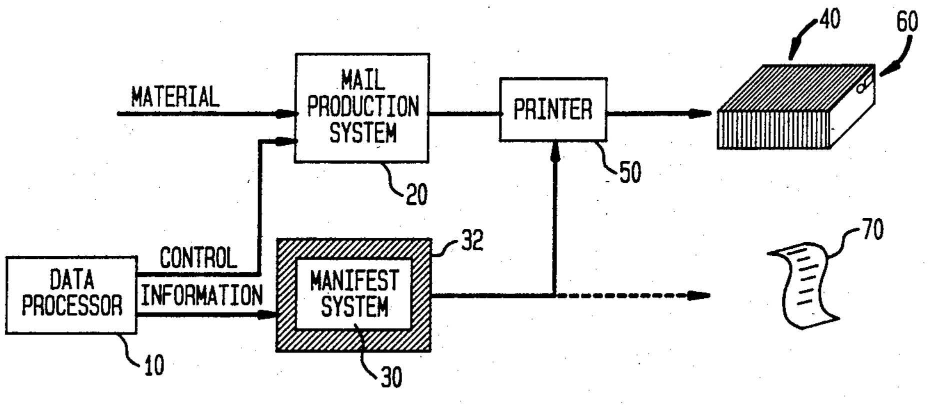
FIG. 1 shows a schematic block diagram of an embodiment of the subject invention used for the production of manifest mail.

FIG. 1 shows a system in accordance with the subject invention which produces a batch of mail pieces in a manner which allows the U.S. Postal Service to easily verify the total postage value for that batch. Data processor 10 is a conventional data processing system which operates to define a batch mailing for a large mailer, such as an oil company or credit card company, which typically mails thousands of mail pieces to its customers every working day. Data processor 10 transmits control information to a conventional mail production system which forms materials such as envelopes, invoices, advertising inserts, etc. into a batch of addressed mail. As will be apparent to anyone who has ever received a credit card bill, such operations are very well known and need not be discussed further here for an understanding of the subject invention.

Information describing the batch of mail produced by system 20 is also transmitted from data processor 10 to manifest system 30. Manifest system 30 is substantially a general purpose computer programmed in accordance with the subject invention annd maintained in a secure housing 32. Manifest system 30 is programmed in accordance with the subject invention to process information received from data processor 10 describing a particular batch of mail 40 to produce an output which may be used by the U.S. Postal Service to verify that the proper total postage value for batch 40 has been paid. A conventional non-secure printer 50 is controlled by manifest system 30 to mark each mail piece in batch 40 with an indicia 60 which will enable the Postal Service to verify batch 40, as will be described further below. As will be seen from the description set forth below, the information in indicia 60 is sufficient to verify batch 40 however, it is within the contemplation of the subject invention to provide a separate manifest document 70 for the convenience of the Postal Service.

The security of manifest system 30 is intended to provide assurance to the Postal Service that system 30 will function as intended and has not been tampered with by the mailer or any other party to provide a false indication of a lower postage value for batch 40. Physically securing mailing systems is well known in the art and is a problem which has long been satisfactorily solved for conventional postage meters by such techniques as placing seals on access panels, using breakaway screws to secure housing covers, and encapsulating critical components. Further description of techniques used to secure system 30 is not believed necessary for an understanding of the subject invention.

Figure 2:
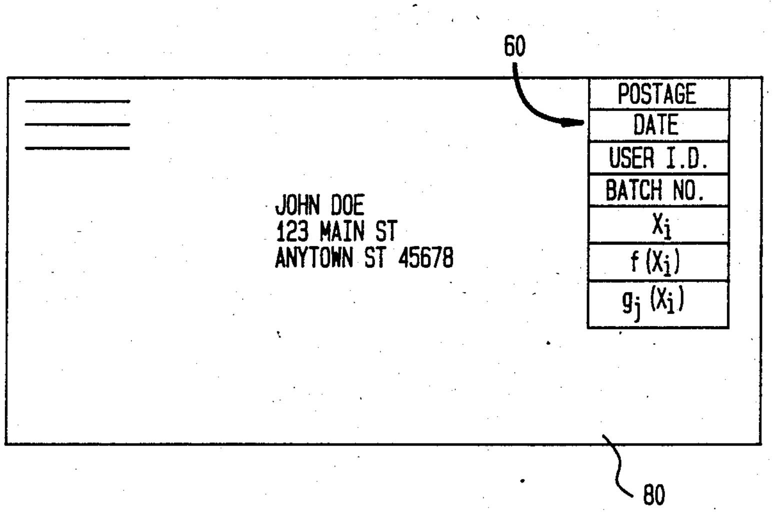
FIG. 2 shows an envelope (i.e. an item) marked in accordance with the subject invention.

FIG. 2 shows an envelope 80 marked with indicia 60 in accordance with the subject invention. Indicia 60 includes plain text specifying the postage for envelope 80, and additional plain text sufficient to identify batch 40, such as the date, a user i.d. number, and a batch number. Additionally, indicia 60 includes three numbers $x_i$, $f(x_i)$ and $g_j(x_i)$ which may be used to verify batch 40 as will be described below.

Figure 3:
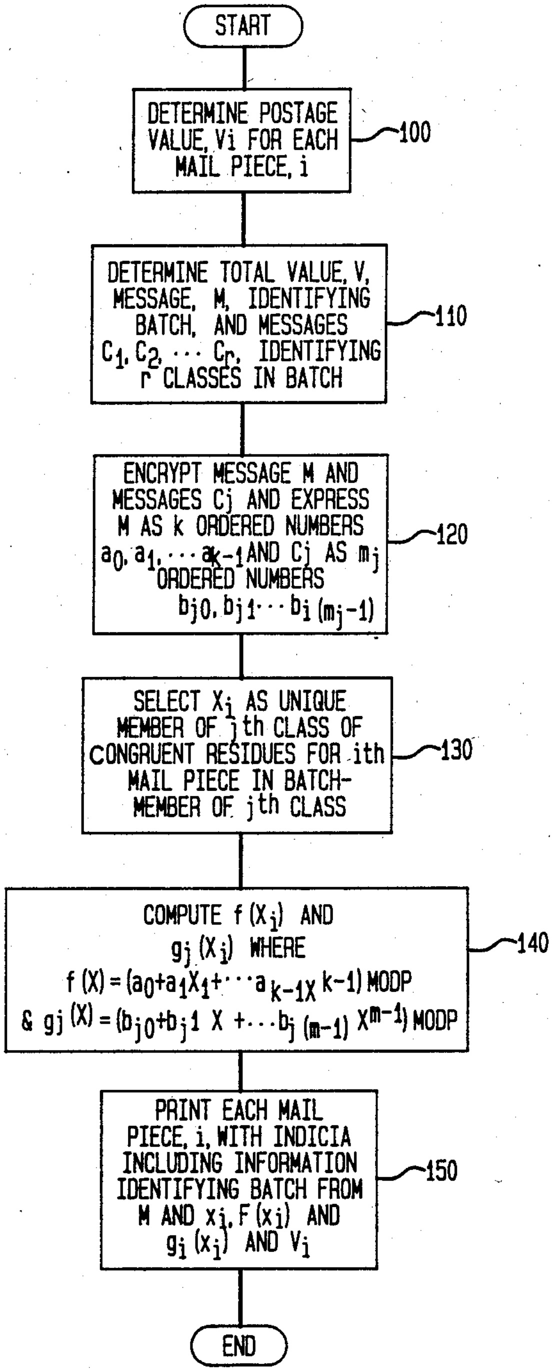
FIG. 3 shows a flow chart of the operation of the system of FIG. 1 in producing a batch of mail pieces in accordance with the subject invention.

FIG. 3 shows a flow chart of the operation of manifest system 30 in accordance with the subject invention. At 100, system 30 determines a postage value, $v_i$, for each mail piece, i. It is within the contemplation of the subject invention that this determination of $v_i$ may be performed either by data processor 10 or that manifest system 30 may operate on the information from data processor 10 to compute $v_i$ for each item, i, in accordance with predetermined postal rate charts. In either event, such a determination is well known and need not be discussed further here for an understanding of the subject invention. At 110 system 30 then determines a total value, V, as a function of the values, $v_i$, for each mail piece, i, and a message, M identifying batch 40, as well as a plurality of messages, $C_1, C_2, \ldots C_r$, identifying r classes in batch 40. At 120 system 30 then encrypts message, M, and messages, $C_j$, and expresses M as k ordered numbers, $a_o, a_1 \ldots a_k-1$ and messages $C_j$ as $m_j$ ordered numbers $b_{jo}, b_{j1}, \ldots b_{j(mj-1)}$. At 130 system 30 selects a unique value $x_i$ for each mail piece, i, such that, for i a member of the jth class in batch 40, $x_i$ is a member of the jth class of congruent residues.

(Congruent residues are a known mathematical technique for classifying a group of numbers uniquely into a specified number of congruent classes. For n a number larger than the number of mail pieces in batch 40, and r the number of classes in batch 40, then two numbers, $x_1$, $x_2$ are members of the same class of congruent residues if, and only if $x_1/x_2$ equals $y^r$ mod n for a selected value of y, provided:

(a) r is a divisor of Phi(n) and $r^2$ is co-prime with Phi(n), wherein Phi(n) is the number of integers less than n and co-prime with n;

(b) y is co-prime with n; and, (c) $y \neq x^r \bmod n$, for any X.

Then at 140 system 30 computes $f(x_i)$ and $g_j(x_i)$ where f(x) equals $(a_o+a_1x_1+ \ldots a_{k-1}x^{k-1}) \bmod p$ and $g_j(x)=(b_{jo}+b_j1x+ \ldots b_{j(m-1)}x^{m-1}) \bmod p$; where p is the smallest prime number greater than the number of mail pieces and the largest of the ordered numbers a and b. At 150 then system 30 prints each mail piece, i, with indicia including the postage value, $v_i$, for that mail piece information identifying batch 40, and $x_i$, $f(x_i)$, and $g_j(x_i)$.

(It will be apparent to those skilled in the art that the numbers p, k, r and $m_j$ must be communited to the Postal Service for the Postal Service to verify a batch of mail in accordance wih the subject invention. The numbers k and $m_j$ will be selected by the Postal Service in accordance with known Postal Service statistical standards as a function of the total number of items N and the number of items in the jth class, respectively. The number y is defined above with respect to N. Accordingly, preferably the numbers N, r and the number of items in each class should be provided to the Postal Service. If a manifest 20 is provided, this information may be included in the manifest. Alternatively, the number N may be included on each item. The Postal Service may then determine p and k, recover the message, M, as described below and determine r, the number of classes, and the number items in each class to determine the $m_j$.)

Figure 4:
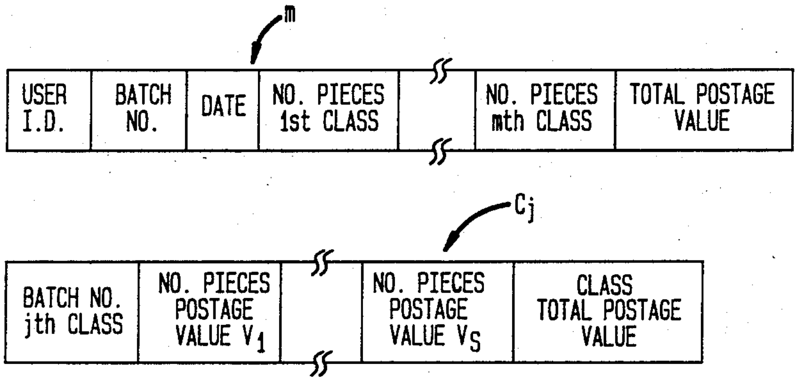
FIG. 4 shows representations of a message describing the batch of mail and a second message describing a particular class of mail within that batch.

FIG. 4 shows typical messages which might be printed on batch 40 in accordance with the subject invention. Message M includes a user i.d., batch number, date, and a total postage value as shown included in indicia 60. For further security information describing batch 40, such as the number of pieces in each class is also included. Messages $C_j$ include information identifying the jth class of a given batch number and the class total postage value and the number of pieces having each particular postage value within the class. Other descriptive messages will, of course be apparent to those skilled in the art and may also be used in accordance with the subject invention.

Figure 5:
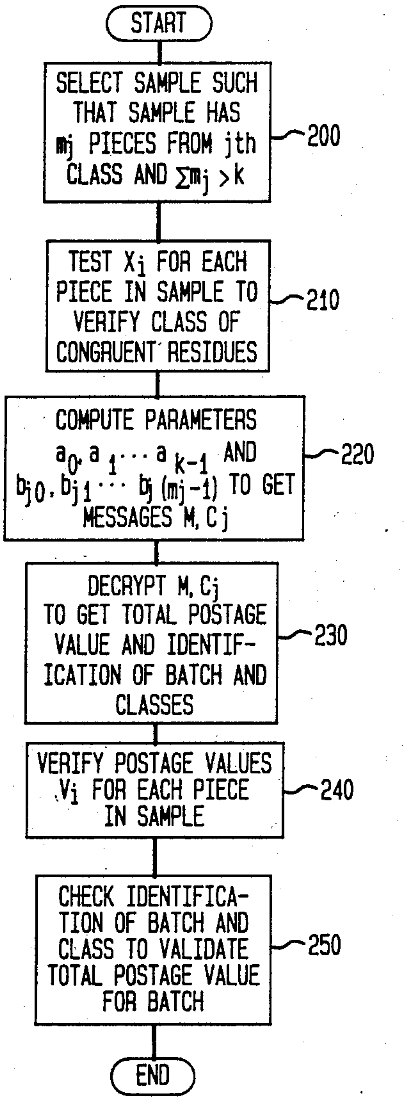
FIG. 5 is a flow chart of the operations of the U.S. Postal Service in verifying a batch of mail in accordance with the subject invention.

FIG. 5 shows a flow chart of the procedure to be carried out by the Postal Service to verify batch 40 (assuming the necessary information has been communicated to the Postal Service by manifest 70). At 200, a sample of $m_j$ pieces from each class, j, is selected. The value $x_i$ for each piece is tested to verify that the value $x_i$ for each mail piece in a given class, j, are all in the same class of congruent residues. From the sum of the $m_j$ samples k are selected at random and the Postal Service then computes the parameters a and b to obtain the messages, M and $C_j$. (Of course, if k is greater than the sum of $m_j$ further random samples may be taken.) Messages, M and $C_j$ are then decrypted to obtain the total postage V and identification of the batch and each class.

It should be noted that encryption of the messages M and $C_j$ is carried out using a known encryption technique, preferably a public key encryption technique such as the RSA encryption algorithm, where the key used by system 30 is securely contained within system 30 and is not accessible by the mailer. Since system 30 is by definition physically secure and the encryption key is not accessible by the mailer, successful decryption by the Postal Service verifies that the messages M and $C_j$ accurately represent the information input to system 30. The Postal Service may then complete verification by assuring that the information input to manifest system 30 accurately described batch 40.

Additional security may be obtained by keeping the number y secure since the determination of y from known values of $x_i$ is highly difficult and without knowledge of y the values, $x_i$, cannot be properly selected as congruent for each class. Further, security can be obtained by keeping the procedure for selecting the numbers k and $m_j$ secure to prevent a fraudulent mailer from properly partitioning counterfeit messages.

At 240 the postal values for each mail piece, $v_i$, are verified by re-determining the postage value for each mail piece in the sample and comparing it to the value, $v_i$, printed on each mail piece, i. Thus, by properly selecting the sample size, k, the Postal Service may obtain an arbitrary degree of confidence that correct values, $v_i$, where used for all mail pieces, i, in batch 40. Finally, at 250 the Postal Service may check the identification and description of batch 40 and each class contained in batch 40 to assure that messages M and $C_j$ were prepared in connection with batch 40.

Thus, it may be seen that the above described embodiment provides a highly advanntageous means for verifying the postage value for a batch of mail pieces which may be presented to the Postal Service in an arbitrary order. Other embodiments of the subject invention will be readily apparent to those skilled in the art from consideration of the attached drawings and the above description. Particularly, it will be readily apparent that the subject invention may be applied to values other than postage values and items other than mail pieces, and that in cases where a batch has only one class of items, that the numbers $x_i$ need not be classified by congruent residues and that only a single message, M need be generated. Accordingly, limitations on the subject invention are only to be found in the claims set forth below.

What is claimed is:

1. A method for verifiably marking a batch of items, comprising the steps of:

(a) generating an encrypted message to identify said batch;

(b) expressing said encrypted message in the form of k ordered numbers (c) defining a function, f, having k parameters each chosen equal to a particular one of said ordered numbers and such that the values of said parameters may be determined from k unique ordered pairs of numbers of the form $x_i$, $f(x_i)$;

(d) selecting a unique value, $x_i$, for each of said items;

(e) computing a value, $f(x_i)$ for each of said $x_i$;

(f) marking each of said items with an ordered pair of numbers$x_i$, $f(x_i)$; whereby (g) a second party may verify said batch by selecting k items to obtain k unique ordered pairs, $x_i$, $f(x_i)$, determining said parameters to obtain said message, and determining if said message correctly identifies said batch.

2. A method as described in claim 1 wherein said items are also marked with values, $v_i$, and said message M includes a total value, V, a function of said values, $v_i$, whereby said second party may further verify said value, V, by confirming said values, $v_i$, for said sample are accurate so as to acquire a level of confidence, depending on k, that all values $v_i$ used to compute value, V, are accurate.

3. A method as described in claim 2 wherein said total value, V, is computed from said values, $v_i$ and said items are marked by a secure apparatus.

4. A method as described in claim 2 wherein said message is encrypted using an algorithm which is maintained secret from the originator of said batch.

5. A method as described in claim 4 wherein said function f has the form $f(x)=(a_o+a_1x+\ldots a_{k-1}x^{k-1}) \bmod p$ and said parameters, a,, are each chosen equal to a particular one of said ordered numbers, and p is a prime number larger than maximum value for any parameter, a, and any $x_i$.

6. A method as described in claim 5 wherein said batch comprises a plurality classes and said values, $x_i$, are selected so that all of said values, $x_i$, for a particular class, j, are members of the same class of congruent residues.

7. A method as described in claim 6 further comprising the steps of:

(a) generating a plurality of messages identifying each of said classes (b) expressing each of said plurality of messages in the form of $m_j$; order numbers;

(c) defining a plurality of functions $g_j$; each having $m_j$ parameters chosen to equal a particular one of said $m_j$ ordered numbers for a corresponding class and such that the values of said parameters may be determined from $j_j$; ordered pairs of numbers, $x_i$, $g_j(x_i)$;

(d) computing a value $g_j(x_i)$ for each item in a jth class; and (e) further marking each of said items in said jth class with a value $g_j(x_i)$.

8. A method for validating a batch of items, said items being marked with unique ordered pairs of numbers, $x_i$, $f(x_i)$, where f is a function having k parameters and such that said parameters may be determined from k unique ordered pairs of numbers of the form $x_i$, $f(x_i)$, comprising the steps of:

(a) selecting k items from said batch to obtain k ordered pairs of numbers of the form $x_i$, $f(x_i)$;

(b) determining said k parameters;

(c) ordering said parameters in a predetermined order to form a message; and (d) decrypting said message in accordance with a predetermined algorithm and determining if said decrypted message identifies said batch.

9. Apparatus for verifiably marking a batch of items, comprising:

(a) means for generating an encrypted message identifying said batch;

(b) means for expressing said encrypted message as k ordered numbers;

(c) means for selecting unique values, $x_i$, for each of said items;

(d) means for computing values, $f(x_i)$ where f is a function having k parameters each chosen equal to one of said ordered numbers and such that said parameters may be determined from k unique pairs of ordered numbers, $x_i$, $f(x_i)$ (e) means for marking each of said items with a unique pair of ordered numbers, $x_i$, $f(x_i)$.

* * * * *